United States Patent [19]
Robinson

[11] 3,991,659
[45] Nov. 16, 1976

[54] FAIL SAFE APPARATUS FOR LOAD LIFTS

[76] Inventor: Morris D. Robinson, 1509 W. 132nd St., Gardena, Calif. 90249

[22] Filed: Dec. 6, 1973

[21] Appl. No.: 422,611

[52] U.S. Cl. .................................. 92/9; 137/517; 188/280; 188/282; 188/316; 188/317
[51] Int. Cl.² ........................................ F15B 15/22
[58] Field of Search ............. 92/9, 8; 188/280, 282, 188/316, 317; 137/517

[56] References Cited
UNITED STATES PATENTS

| | | | |
|---|---|---|---|
| 337,236 | 3/1886 | Briscoe | 137/517 |
| 1,007,377 | 10/1911 | Nielsen | 92/9 |
| 1,096,431 | 5/1914 | Kepple | 137/517 |
| 1,320,060 | 10/1919 | Jenney | 188/317 X |
| 1,563,169 | 11/1925 | Daniel et al. | 188/282 |
| 1,837,815 | 12/1931 | Hadley | 188/316 |
| 1,897,765 | 2/1933 | Pehlke | 188/317 |
| 2,621,583 | 12/1952 | Victor | 188/316 X |
| 2,676,573 | 4/1954 | Abbe | 92/9 X |
| 2,856,233 | 10/1958 | Boyce et al. | 92/9 X |
| 3,064,514 | 11/1962 | Wilson | 92/9 X |
| 3,081,743 | 3/1963 | Bishop et al. | 92/9 |
| 3,158,208 | 11/1964 | Kammerer | 92/9 X |
| 3,369,679 | 2/1968 | Robinson | 214/77 P |
| 3,476,266 | 11/1969 | Devol | 92/9 X |
| 3,749,122 | 7/1973 | Gold | 137/517 X |
| 3,841,520 | 10/1974 | Bryant et al. | 137/517 X |

FOREIGN PATENTS OR APPLICATIONS

| | | | |
|---|---|---|---|
| 184,326 | 4/1907 | Germany | 137/517 |
| 973,873 | 10/1964 | United Kingdom | 91/447 |

*Primary Examiner*—Irwin C. Cohen

[57] ABSTRACT

To prevent rapid collapse of a hydraulic lift mechanism in event of the failure of the hydraulic mechanism (e.g. as by rupture of a pressurized hydraulic line) a rate of flow responsive check valve is provided, either in a separate backup cylinder or at the inlet-outlet port of the lift cylinder, to close off the return flow path of the hydraulic line in the event of sudden depressurization of the hydraulic feed line or other pressure failure in the hydraulic liquid. In normal operation, the check valve does not oppose the return flow since the rate of such flow is insufficient to activate the valve.

8 Claims, 7 Drawing Figures

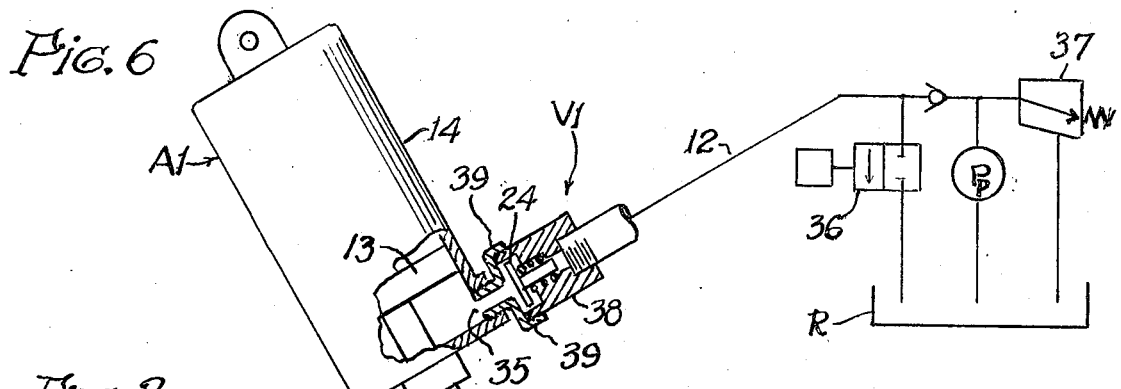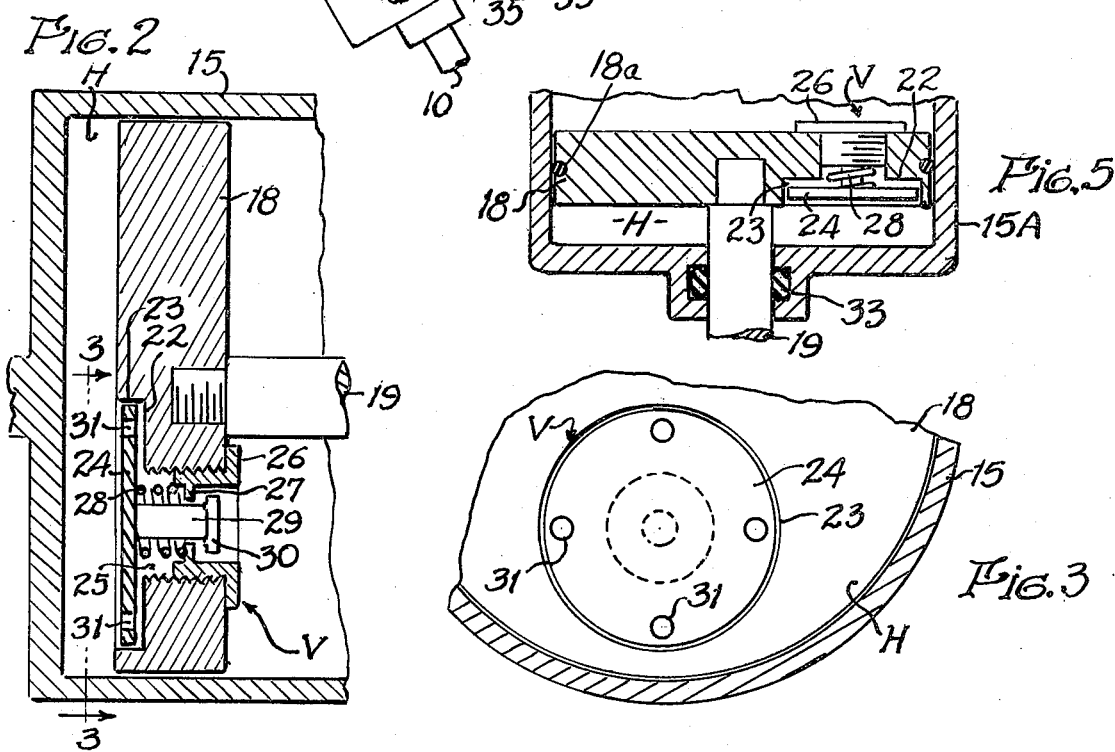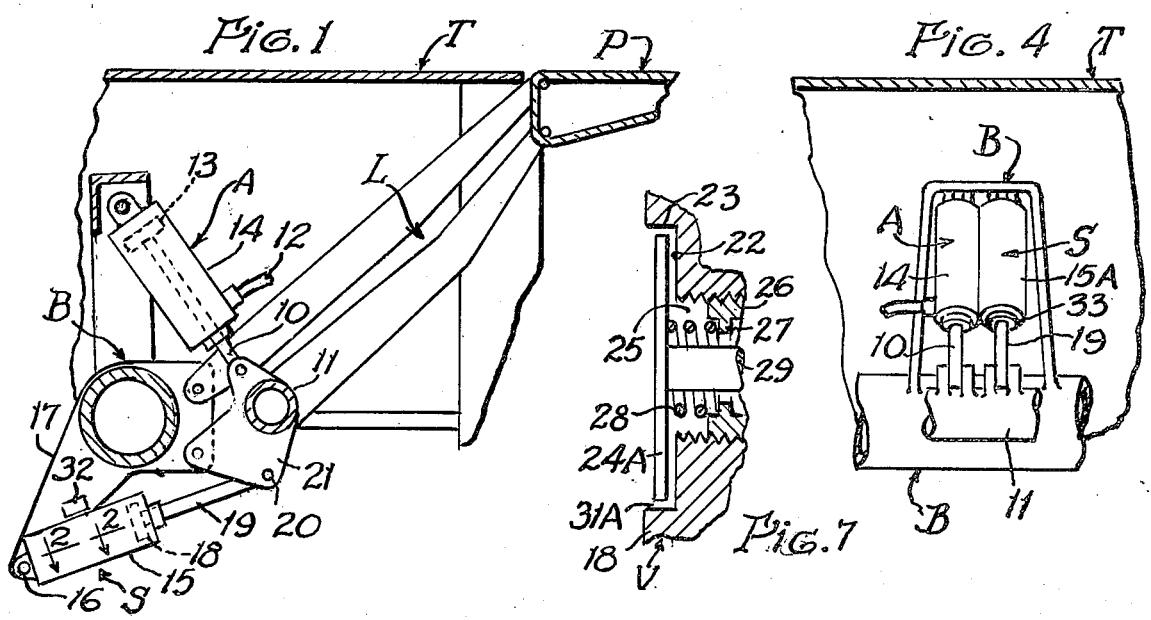

FAIL SAFE APPARATUS FOR LOAD LIFTS

BACKGROUND OF THE INVENTION

Check valves, operable to permit flow only in one direction, are well known and widely used in various applications. The conventional check valve, however, does not provide for a normal two-way flow in normal operation of the apparatus in which it is utilized. Hydraulic lifts are also well known and widely used in various applications, one of which is in tail gate lifts for transport trucks, for lifting heavy loads from ground level to the level of the truck bed, and vice versa, lowering such loads to the ground at a delivery point. If the hydraulic lift mechanism of such apparatus were to suddenly fail when the load platform is in an elevated position, the sudden collapse of the platform and its lift linkage could cause injury to workmen operating the lift and damage to merchandise (e.g. refrigerator, stove, etc.) being handled by the lift. Such a lift is disclosed in my U.S. Pat. No. 3,369,679.

SUMMARY OF THE INVENTION

This invention provides a mechanism for checking any rapid return movement of a mechanism powered by a hydraulic actuator, by interposing in a path along which hydraulic fluid must return-flow in order to allow such return movement, a valve which, in operating at a normal flow rate, will allow return flow through an aperture or apertures in the valve's movable closure element, but which under the effect of a rapid flow in the return direction, will engage a valve seat so as to close off the flow through such aperture, to an extent sufficient to limit the return flow to a safe rate of return of the lift platform to ground level.

The general object of the invention is to provide a relatively simple fail-safe means for limiting the rate of return movement of a hydraulic mechanism to a relatively slow, safe rate in the event of failure in the hydraulic mechanism.

This and other objects will become apparent in the ensuing description and appended drawing, in which:

FIG. 1 is a sectional view of a load lift apparatus at the rear end of a transport truck, with one embodiment of the invention therein;

FIG. 2 is a fragmentary sectional view of the backup cylinder of FIG. 1, showing the return regulating valve;

FIG. 3 is a fragmentary sectional view of the same, taken on the line 3—3 of FIG. 2;

FIG. 4 is a transverse sectional view of a portion of the rear end of a truck equipped with a fail-safe backup cylinder arrangement embodying a modified form of the invention;

FIG. 5 is a fragmentary sectional view of the same;

FIG. 6 is a schematic illustration of another modified form of the invention; and FIG. 7 shows another modified form of the invention.

Description

Referring now to the drawing in detail, I have shown in FIG. 1 thereof, as an example of one form in which the invention may be embodied, the application of a fail-safe backup cylinder to a truck load lift of the type disclosed in my U.S. Pat. No. 3,369,679 comprising, in general, a lift platform P carried by parallel arm linkage L in such a manner as to be elevated from ground level to the level of the bed T of a transport truck upon power actuation by hydraulic fluid, of a cylinder actuator A having a piston rod 10 pivotally coupled to a cross beam 11 of the lift linkage L. For actuation of the lift unit A, hydraulic fluid is introduced through a pressure line 12 into the lower end of the actuator cylinder so as to exert lift against a piston 13 securely attached to the upper end of piston rod 10 within the cylinder. The apparatus of FIG. 1 is shown in the fully elevated position of the parts, the piston 13 being drawn into the cylinder to its upper limit position as indicated. Should the hydraulic line 12 become ruptured, or the hydraulic pressure fail in any other manner, the weight of platform P and linkage L, in the absence of the fail-safe apparatus of the invention, would rapidly drop back to ground level, damaging any merchandise carried by platform P and creating the possibility of injury to workmen operating the lift.

FIG. 1 shows the application of the invention in one form (a backup cylinder) to such lift to prevent the rapid collapse of the lift mechanism in the event of such a failure of hydraulic pressure. The backup cylinder, indicated generally at S, comprises (FIG. 2) a cylinder 15 having a pivotal connection 16 with a suitable extension 17 of bracket B; a piston 18 slidable in the cylinder 15; a piston rod 19 attached to piston 18 and extending through the opposite end of cylinder 15; a connection 20 pivotally anchoring the end of rod 19 to a suitable bracket extension 21 of lift linkage L; and a fail-safe valve V mounted in the piston 18.

Valve V comprises a valve seat 22 which may consist of the flat bottom of a shallow counterbore 23 in piston 18; a movable valve disc 24 received in counterbore 23 in opposed normally spaced relation to valve seat 22; a valve port 25 extending from counterbore 23 through piston 18 to its back side; a retainer collar 26 mounted in port 25 and having an internal spring-seat flange 27 of annular form; a coil spring 28 retained in collar 26, seated against flange 27 and engaged against the back side of valve disc 24 to normally maintain it in spaced, unseated relation to valve seat 22; and a stem 29 secured to the back side of disc 24 and extending through coil spring 28 and through a central opening defined by flange 27; and a head 30 attached to the rear end of stem 29 and engageable with flange 27 to retain valve disc 24 within counterbore 23. Valve disc 24 is perforated to provide a plurality of ports 31 through which hydraulic fluid may normally flow into the space normally existing between disc 24 and valve seat 22, and thence through port 25 to the back side of piston 18. Such return flow of fluid from the front side of the piston will occur during normal return (lowering) of the powered mechanism (platform P and linkage L) when controlled escape of hydraulic fluid from actuator A through pressure line 12 is effected. During such normal return flow, spring 28 will be effective to maintain valve disc 24 in spaced (open) relation to valve seat 22 against the drag of fluid passing through ports 31 and tending to move disc 24 into closed position against seat 22.

If a failure of hydraulic pressure should occur (as a result of a rupture in pressure line 12 or from any other cause) the weight of platform P and linkage L will cause an initial rapid drop toward the ground, accompanied by return movement of piston 18 rapidly toward the closed end of cylinder 15. The opposing body of hydraulic liquid in cylinder 15 between its closed end and piston 18 will be forced against the valve disc 24 and will attempt to flow through valve port 25 at an accelerated rate which will be more than the capacity of ports 31 to pass the liquid, and the resulting rapid buildup of pressure in the trapped fluid will overcome the resistance of spring 28 and force the valve disc 24 against its seat 22. Since ports 31 are in registering relation to seat 22, they will be closed off by seating engagement of valve disc 24 against the seat, thus suppressing the return flow except for minor leakage past the periphery of piston 18. In some applications it may be desirable to block the flow completely so as to arrest return movement of the mechanism completely, and this can be accomplished by the use of conventional piston rings or O-rings 18a (FIG. 5) in the periphery of piston 18. Where this is not required, the leakage past the piston periphery can be utilized to allow a slow, controlled return of the lift platform or other powered mechanism to its starting position.

When the power cylinder A is being actuated to elevate platform P, hydraulic fluid will flow freely through valve V into the closed end of cylinder 15 to allow the piston rod 19 to extend as it follows the upward movement of linkage L. Head 30 has a configuration on its side facing flange 27, such as to prevent the closing of port 25 by engagement of head 30 against the flange 27.

For filling cylinder 15, a filling neck, normally closed by a cap 32, is provided in cylinder 15.

In some installations it may be desirable to arrange the backup cylinder S alongside the power actuator A as in FIG. 4. In such an arrangement the valve V will be mounted in piston 18 in the reverse arrangement shown in FIG. 5, and the piston rod 19 will be sealed in the end of cylinder 15A through which it projects, as indicated at 33.

In the modified form of the invention shown in FIG. 6, instead of a separate backup cylinder with a fail-safe valve mounted in its piston, the valve unit V1 is attached to the fluid ingress-egress port 35 of the actuator A1, between the cylinder 14 and the fluid pressure line 12. Its movable valve disc 24 is arranged to block rapid return flow from actuator A1 to pump $P_p$ which, for a lifting operation, draws hydraulic fluid from a reservoir R and delivers it under pressure to actuator A1. FIG. 6 also illustrates schematically the control valve 36 and bypass valve 37 of a conventional lift actuator circuit (applicable to the apparatus of FIG. 1 as well as that of FIG. 6). Valve V1 may include a valve body 38 coupled (as by threading) to a fitting 39 connected to the cylinder 14. Fitting 39 restricts the opening movement of valve disc 24, dispensing with retainer head 30 of FIG. 2.

As shown in FIG. 7, the flow port past the valve disc 24A may be an annular space 31A between the periphery of disc 24A and the peripheral wall of counterbore 23, instead of separate ports 31 through valve disc 24. Seating of valve disc 24 of FIG. 2 against seat 22 will restrict escape of hydraulic fluid from the trapping chamber in a manner equivalent to that of the valve of FIG. 7.

While the invention has been illustrated as applied to a hydraulic lift, it is also applicable to other mechanisms utilizing a hydraulic actuator for powering their operation, such as Fork Lifts, Dump Bodies, Platform Lifts, etc.

I claim as my invention:

1. In a hydraulic power mechanism having frame means and means presenting a load to be overcome, the combination of:
    a hydraulic actuator connected between said frame means and said means presenting a load; and
    a rate of flow responsive fail-safe valve device connected between said frame means and said means presenting a load, said fail-safe valve device comprising:
    a cylinder and a piston cooperatively defining a pair of hydraulic chambers one on each side of said piston containing hydraulic fluid;
    a passageway between the inner surface of said cylinder and the outer periphery of said piston to permit limited flow of fluid, trapped in one of said chambers, through said passageway;
    said cylinder and piston being so arranged relative to said mechanism as to enlarge said one chamber during actuation of said hydraulic actuation to overcome said load;
    said fail-safe device including:
    a valve plunger, said plunger including a movable flat disc and a central stem;
    stop means on said plunger for limiting axial movement of said plunger, said piston having an off-center bore therethrough receiving said stem and said stop means, said bore containing a stop element therein for engagement by said stop means, said piston having a counterbore concentric with and larger than said bore for receiving said disc, said counterbore defining a valve seat for said disc; and
    resilient means in said bore for biasing said disc away from said valve seat to provide an open valve; and
    wherein a fluid path is provided between said disc and said counterbore, between said stem and said bore and stop element, and between said bore and said stop means through which said fluid may escape from said one chamber in return flow during normal return movement of the mechanism, and through which the escape of fluid from said chamber is reduced when the mechanism exceeds a predetermined rate of return movement and the force of said spring is overcome to permit said disc to seat in said counterbore, said limited flow being less than the flow through said path during normal movement of the mechanism and being greater than the flow through said path when the mechanism exceeds said predetermined rate of return movement.

2. The combination as claimed in claim 1, wherein said first-mentioned hydraulic chamber is defined between a closed end of said cylinder and said piston.

3. The combination as claimed in claim 1, wherein the other of said chambers is defined between a closed end of said cylinder and said piston.

4. The combination as claimed in claim 1, wherein:
    said disc has a series of ports near its periphery;
    said ports are in opposed relation to said valve seat so as to be closed off by engagement of said disc with said seat in an annular area radially inward of said ports.

5. The combination as claimed in claim 1, wherein said disc is smaller in diameter than said counterbore to define an annular space between the periphery of said disc and the peripheral wall of said counterbore.

6. The combination as claimed in claim 1, wherein said stop element includes:
    an annular collar threaded into said bore from the side of said piston opposite to that of said counterbore;
    said collar having an internal abutment flange against which one end of said resilient means is seated, the other end of said resilient means abutting said disc;

said stem extending through a central opening defined by said flange and having at its end a head defining said stop means engageable against said flange to limit movement of said valve disc out of said recess.

7. The combination as claimed in claim 1, wherein said piston has the general form of a flat circular disc having spaced parallel faces, and wherein said fail-safe valve is confined between said parallel faces.

8. In a hydraulic power mechanism having frame means and means presenting a load to be overcome, the combination of:
- a hydraulic actuator connected between said frame means and said means presenting a load; and
- a rate of flow responsive fail-safe valve device connected between said frame means and said means presenting a load, said fail-safe valve device comprising:
- a cylinder and a piston cooperatively defining a pair of hydraulic chambers containing hydraulic fluid, one on each side of said piston, in which trapped fluid in one of said chambers will be effective to oppose action of said load tending to effect return movement of said mechanism;
- sealing means between said cylinder and said piston to block flow of said trapped fluid around said piston;
- said cylinder and piston being so arranged relative to said mechanism as to enlarge said one chamber during actuation of said hydraulic actuation to overcome said load;
- said fail-safe device including:
- a valve plunger, said plunger including a movable flat disc and a central stem;
- stop means on said plunger for limiting axial movement of said plunger, said piston having an off-center bore therethrough receiving said stem and said stop means, said bore containing a stop element therein for engagement by said stop means, said piston having a counterbore concentric with and larger than said bore for receiving said disc, said counterbore defining a valve seat for said disc; and
- resilient means in said bore for biasing said disc away from said valve seat to provide a normally open valve; and
- wherein a fluid path is provided between said disc and said counterbore, between said stem and said bore and stop element, and between said bore and said stop means through which said trapped fluid may escape from said one chamber in return flow during normal return movement of the mechanism, and through which the escape of trapped fluid from said chamber is reduced when the mechanism exceeds a predetermined rate of return movement and the force of said spring is overcome to permit said disc to seat in said counterbore, said limited flow being less than the flow through said path during normal movement of the mechanism and being greater than the flow through said path when the mechanism exceeds said predetermined rate of return movement.

* * * * *